(12) United States Patent
Crebier

(10) Patent No.: US 10,839,448 B2
(45) Date of Patent: Nov. 17, 2020

(54) ELECTRONIC COMMERCE PLATFORM

(71) Applicant: Globe Interfin S.A., Luxembourg (LU)

(72) Inventor: Gerard Crebier, Eyragues (FR)

(73) Assignee: GLOBE INTERFIN S.A., Luxembourg (LU)

( * ) Notice: Subject to any disclaimer, the term of this patent is extended or adjusted under 35 U.S.C. 154(b) by 725 days.

(21) Appl. No.: 14/761,053

(22) PCT Filed: Jan. 16, 2014

(86) PCT No.: PCT/EP2014/050831
§ 371 (c)(1),
(2) Date: Jul. 15, 2015

(87) PCT Pub. No.: WO2014/111483
PCT Pub. Date: Jul. 24, 2014

(65) Prior Publication Data
US 2016/0027093 A1 Jan. 28, 2016

(30) Foreign Application Priority Data

Jan. 16, 2013 (FR) ..................................... 13 50356
Aug. 20, 2013 (FR) ..................................... 13 58079

(51) Int. Cl.
*G06Q 30/00* (2012.01)
*G06Q 30/06* (2012.01)
(Continued)

(52) U.S. Cl.
CPC ......... *G06Q 30/0635* (2013.01); *G06Q 10/08* (2013.01); *G06Q 10/0832* (2013.01);
(Continued)

(58) Field of Classification Search
CPC .... G06Q 30/0635; G06Q 10/08; G06Q 50/28; G06Q 10/0832; G07F 9/105; G07F 11/54; G07F 17/12
(Continued)

(56) References Cited

U.S. PATENT DOCUMENTS

| 8,686,831 | B2 * | 4/2014 | Green | G07C 9/00111 340/10.1 |
| 2002/0035515 | A1 * | 3/2002 | Moreno | A47G 29/141 340/5.73 |

(Continued)

FOREIGN PATENT DOCUMENTS

| DE | 2002006003054 | 6/2006 |
| DE | 102006025876 | 12/2007 |

(Continued)

OTHER PUBLICATIONS

R. Aarinen, M. Kivikoski and L. Sydanheimo, "Shop2box concept and radio frequency identification," IEEE International Conference on Systems, Man and Cybernetics, Yasmine Hammamet, Tunisia, 2002, pp. 6 pp. vol. 3-, doi: 10.1109/ICSMC.2002.1176121. (Year : 2002).*

*Primary Examiner* — Anand R Loharikar
(74) *Attorney, Agent, or Firm* — Bachman & LaPointe, P.C.

(57) ABSTRACT

An electronic commerce system comprising an electronic commerce platform for looking at items and preparing an order from a computer connected to the server of the platform via a computer network. At least one piece of equipment for providing an order comprising at least one area equipped with a counter that is controlled by the local computer and means for conversing with a code reader. The area comprises a plurality of mobile compartments configured to be related by said counter allowing the items to be removed and/or put into said compartment. Means for
(Continued)

allowing the registration of a code corresponding to the compartment containing the items of an order, the secure transmission of said code is the form of an electronic identification and means to present said code to activate the movement of the compartment under consideration opposite the counter and opening of said counter to remove items corresponding to the order.

8 Claims, 4 Drawing Sheets

(51) Int. Cl.
| | |
|---|---|
| *G07F 9/10* | (2006.01) |
| *G07F 11/54* | (2006.01) |
| *G07F 17/12* | (2006.01) |
| *G06Q 10/08* | (2012.01) |
| *G06Q 50/28* | (2012.01) |

(52) U.S. Cl.
CPC ............. *G06Q 50/28* (2013.01); *G07F 9/105* (2013.01); *G07F 11/54* (2013.01); *G07F 17/12* (2013.01)

(58) Field of Classification Search
USPC .................................................. 705/26.1–27.2
See application file for complete search history.

(56) References Cited

U.S. PATENT DOCUMENTS

| | | | |
|---|---|---|---|
| 2002/0177922 A1* | 11/2002 | Bloom | ................... G06Q 20/00 700/213 |
| 2005/0060063 A1 | 3/2005 | Reichelt et al. | |
| 2009/0222129 A1* | 9/2009 | Waddington | ...... G06F 17/30902 700/216 |

FOREIGN PATENT DOCUMENTS

| | | |
|---|---|---|
| EP | 1076213 | 2/2001 |
| EP | 1255233 | 11/2002 |
| JP | 2002029616 | 1/2002 |
| WO | WO0112922 | 2/2001 |
| WO | WO2004114234 | 12/2004 |

* cited by examiner

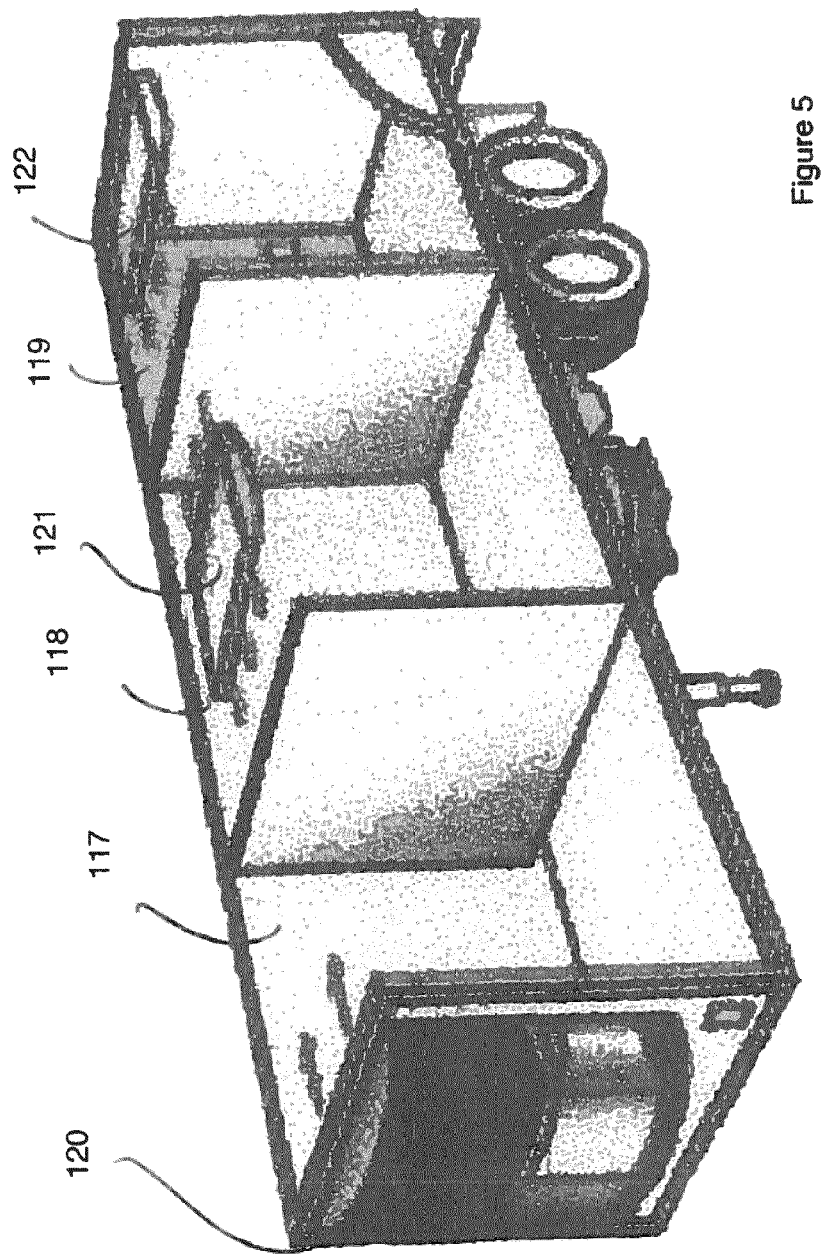

ELECTRONIC COMMERCE PLATFORM

BACKGROUND

The present invention relates to the field of infrastructures for the online selling of items, and more specifically to the methods and the equipment enabling a consumer to place an order online and to remove the items ordered from a piece of equipment for providing such items securely accessible by the seller on the one hand and by the buyer on the other hand.

Various systems making it possible to place an order online and to collect the articles on a dedicated website are known in the state of the art.

The patent application WO2004/114234 describes a storage machine intended to be implemented for the electronic commerce.

The patents US2005/060063, EP1076213, and EP1255233 describe other similar solutions for selling items.

The systems of the prior art are not totally satisfactory.

The known solutions involve the use of bulky equipment, so as to enable the delivery of items having various sizes, and requiring the compartments to have dimensions according to the largest item to be delivered.

Besides, if some items require to be kept at a refrigerated temperature, the whole equipment is refrigerated, which results in high operating costs.

A preferred alternative solution of the invention relates to an optimized logistic system.

In order to optimize the grouping and the preparation of the orders and to reduce the logistic costs, it is desirable to gather such operations by centralizing same for the greatest number of orders and therefore users.

However, this requires implementing a large number of delivery operations, which are costly and do not always give satisfaction to the customer who must be available at the time of delivery of the order.

The solutions implementing automatic lockers require a part of the order preparing operations to be executed not in a specific logistics center, but on the lockers site, generally through tedious manual operations and which may cause an erroneous distribution of the items intended for the site under consideration.

The solution consisting in depositing the order in a temporary storage point also implies extra costs and more complex logistics chain.

SUMMARY

To remedy these drawbacks, the present invention relates to an electronic commerce system comprising:
- an electronic commerce platform for looking at the items and preparing an order from a computer connected to the server of said platform via a computer network,
- at least one piece of equipment for providing an order comprising at least one area equipped with a counter that is controlled by the local computer and means for conversing with a code reader, characterized in that said area comprises a plurality of mobile compartments that are capable of being related to said counter to permit removal and/or introduction of items into the compartment, and with the system further comprising means for enabling the registration of a code corresponding to the compartment into which the items of an order have been placed, the secure transmission of said code to the user who placed said order in the form of an electronic notification and means for allowing said user to submit said code in order to activate the movement of the compartment under consideration opposite the counter, and the opening of said counter in order to remove the items corresponding to the order.

Said equipment for providing the items preferably comprise at least two storage zones thermo-regulated at different temperatures.

Said equipment for providing items advantageously comprises at least one code reader and one computer controlling the movement of the compartments and the unlocking of the counter, as well as a display indicating the counters to be opened according to the code.

In one alternative embodiment, the system comprises a plurality of equipment for providing the items and comprises means for printing labels to identify the batches of the same order and intended for different compartments of the same equipment for providing the items.

According to another alternative solution, the system comprises a plurality of order preparation centers, and a server for outputting information for grouping a plurality of items of the same order prepared in different preparation centers.

The invention also includes a piece of equipment for providing items for an electronic commerce system consisting of a kiosk having at least two series of mobile compartments to allow the movement opposite a counter, and a computer controlling the movement of said series of mobile compartments according to a code presented to a code reader.

Advantageously, the kiosk includes a plurality of mobile plates, each having partition walls forming said compartments.

Preferably, the kiosk has a first thermo-regulated zone at a temperature corresponding to the storage temperature of frozen items, a second thermo-regulated zone at a temperature corresponding to the storage temperature of fresh products, and a third zone at a temperature suitable for non-food products.

According to a particular embodiment, the kiosk has N compartments in said first zone, 2N compartments in said second zone and 3N compartments in said third zone.

To overcome these drawbacks, the present invention relates, in one example of a preferred implementation, to a system for the online ordering and delivering of items comprising an online ordering server, an order grouping center and means for delivering the orders to the end client, characterized in that said means for delivering the orders consists of trailers moving between said grouping center and a remote location, with said trailer comprising means for loading the items ordered into partitioned compartments, and means for controlling the access to said partitioned compartments, with said control means being so configured as to receive an access code delivered by said grouping center from the information processed within the scope of the online order, so as to provide the user with a code capable of controlling the access to the partitioned compartment corresponding to his/her order.

Advantageously, said trailer comprises at least one series of mobile compartments to allow the positioning of one of the compartments opposite an access hatch in response to the presentation of said code by the user.

The invention also relates to a trailer for delivering items, characterized in that it comprises a plurality of series of compartments, longitudinally aligned and each communicating with a hatch opening on the side wall of said trailer.

In a preferred embodiment, it comprises at least one refrigerated zone.

The trailer of the invention preferably comprises a code reader associated with a computer controlling the comparison of the code presented by a user with a memory containing the codes calculated by the grouping center, and the identifier of the associated compartment, with said computer controlling the movement of said compartments and the unlocking of the corresponding [zone].

BRIEF DESCRIPTION OF THE DRAWINGS

The present invention will be better understood upon reading the following description, while referring to a non restrictive embodiment, illustrated by the appended drawings wherein:

FIG. 5 shows an inside view of a trailer according to the invention.

DETAILED DESCRIPTION

Figure 1:
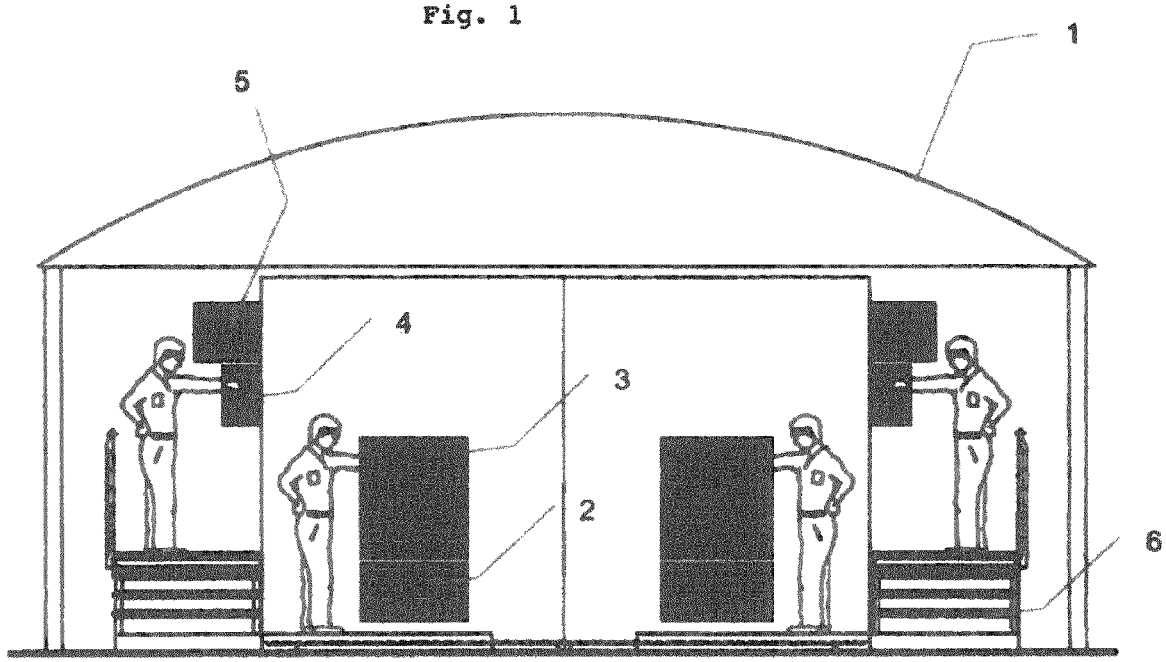
FIG. 1 shows a view of an exemplary kiosk according to the invention

FIG. 1 shows an exemplary embodiment of a kiosk according to the invention.

It consists of a building construction intended to be used as a shelter.

Such construction 1 is provided with several locations enabling a client or the delivery person to access the items stored inside. A first series of counters 2, 3 provides access to the most bulky items, stored in zones at room temperature or a slightly chilled temperature, for example around 12° C.

A series of steps 6 gives access to the counters 4, 5 corresponding to the thermo-regulated compartments wherein less bulky items, more specifically the frozen and fresh products are stored.

Figure 2:
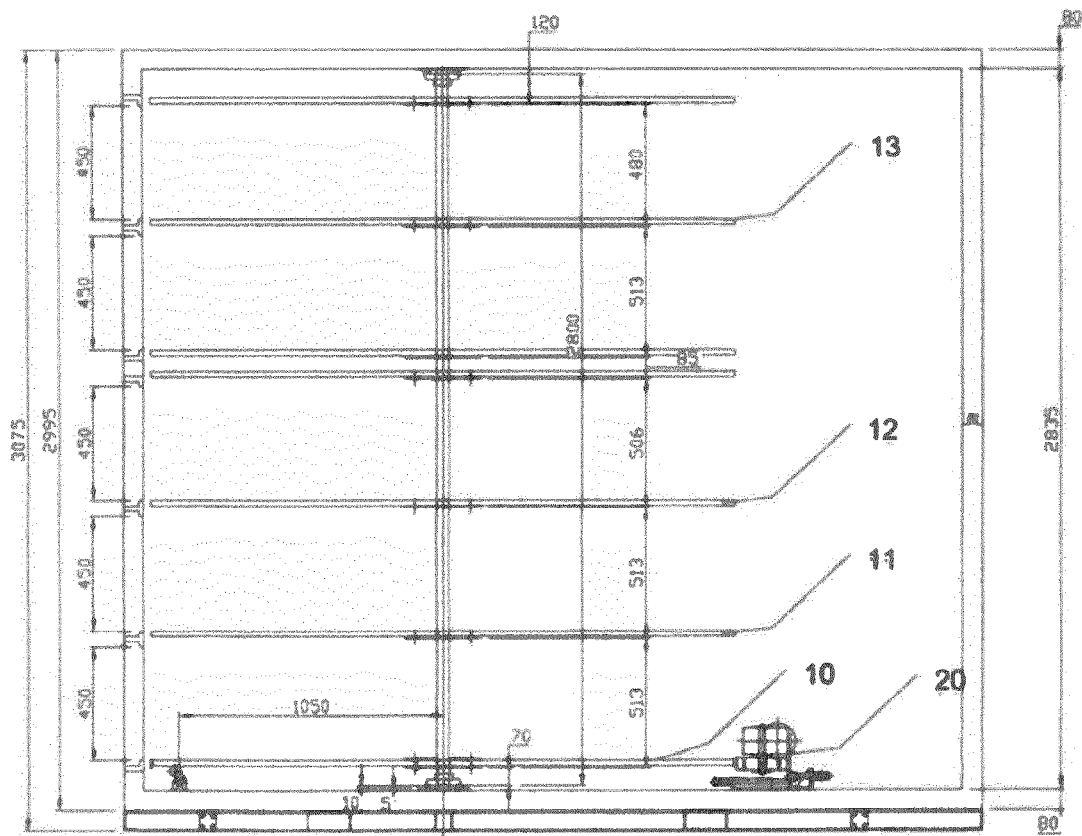
FIG. 2 shows a sectional view of a kiosk according to the invention

FIG. 2 shows a sectional view of such a kiosk.

It comprises a series of plates 10 to 13 surmounted by partition walls forming the compartments intended for transitorily receiving the items.

A motor 20 drives the plates into rotation so as to move the compartment to be loaded or unloaded opposite the counter, according to the instructions issued by a computer receiving information from a code reader.

Placing an Electronic Order

The first step consists in placing an order from a commercial site of a known type.

For this purpose, the client prepares the order on the retail website of the trade sign on the Internet, and chooses a delivery in one of the serviced kiosks. The selection is made from mapping software which helps the user in identifying the nearest kiosk to the desired location, and optionally calculates the route and travel time.

When placing the order, computer exchange occurs between the retail site of the trade sign and the servers managing the kiosks for providing the items, so as to ensure sufficient availability in the desired kiosk (one locker per temperature and one kiosk occupancy rate below 90% because, at this stage, the volume of the basket is not known).

The Internet user goes on with his/her order and fills his/her virtual cart, validates it and pays for his/her order as for a usual electronic order. An email confirming the order is sent by the server of the trade sign.

Preparation of the Physical Order

When the electronic order is validated, the merchant prepares the order and packages it in bags and/or boxes.

A new computer exchange occurs between the merchant site of the trade sign and the kiosk managing the servers so as to print labels to be positioned on each package or bag. Each label has a bitmap of the QR-CODE type and a color code indicating the storage temperature.

At this stage, the exact volume of the order is known, the previously reserved lockers in excess are freed or some more are locked.

The seller then proceeds to print the labels, the packages are ready to be placed in the temperature-regulated kiosk. The labels are provided by the kiosk managing server in the form of A4 sheets in PDF format and which can be printed on any printer.

When the preparation of the order is completed, the server sends a new email to the client indicating that the order has been prepared by the trade sign and is awaiting delivery to the kiosk.

Delivery of the Physical Order to the Kiosk

A refrigerated truck collects all the orders of this trade sign intended to one or more kiosk(s). The routing circuits are thus optimized to reduce the delivery rounds and pool the items according to a N×M model, i.e. by organizing the transport from a plurality of N order preparation centers to a plurality of M kiosks.

When arriving at the kiosk corresponding to one or more item(s), the delivery person passes the label of each package or bag provided with a QrCode, in any order including mixing the orders. The kiosk identifies the locker and opens the door corresponding to this order. The delivery person can thus optimize his/her delivery by presenting the packages according to the storage temperature thereof.

The kiosk controls the movement and the opening of each locker, in order to enable the delivery of the items into the locker corresponding to the required storage temperature. The items are checked using the bitmap code placed on each batch, using a sensor provided on each station.

When all the items in an order have been delivered to the corresponding kiosk, the server sends an e-mail confirming the availability thereof. The client can, from that moment, collect his/her delivery. Simultaneously, an SMS is sent if the client has communicated his/her mobile number. The email contains a QrCode that identifies the client's order. The SMS contains a collection code. The customer can interchangeably use either one.

Removing the Order

The client goes to the kiosk he/she selected and which is mentioned in the confirmation messages. He/she shows the bitmap code, or the code sent by SMS to a reader.

The display screen then gives the door(s) to be opened to remove the ordered items.

Mobile Alternative Solution

Figure 3:
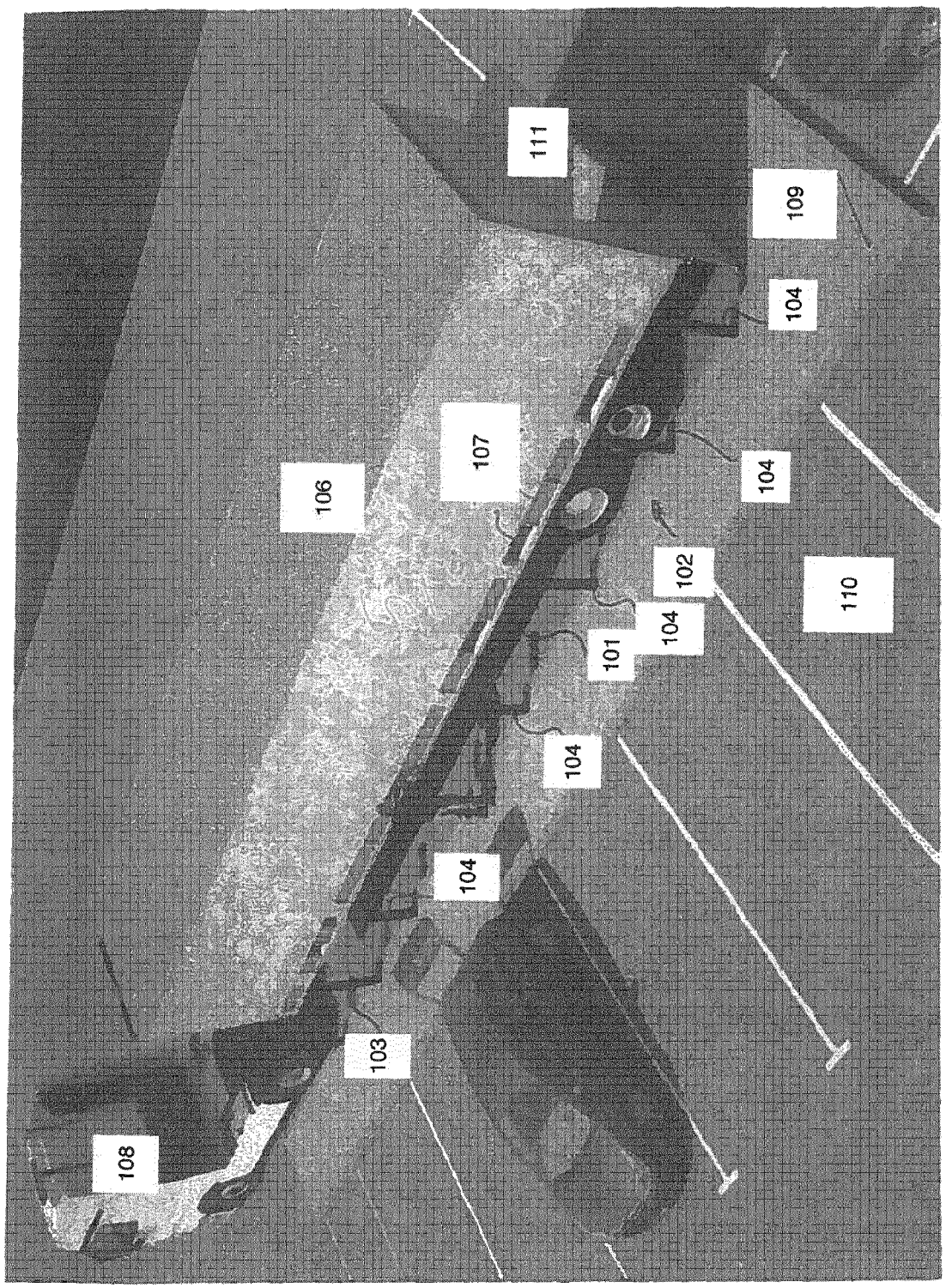
FIG. 3 shows a schematic view of a trailer according to an alternative solution of the invention
Figure 4:
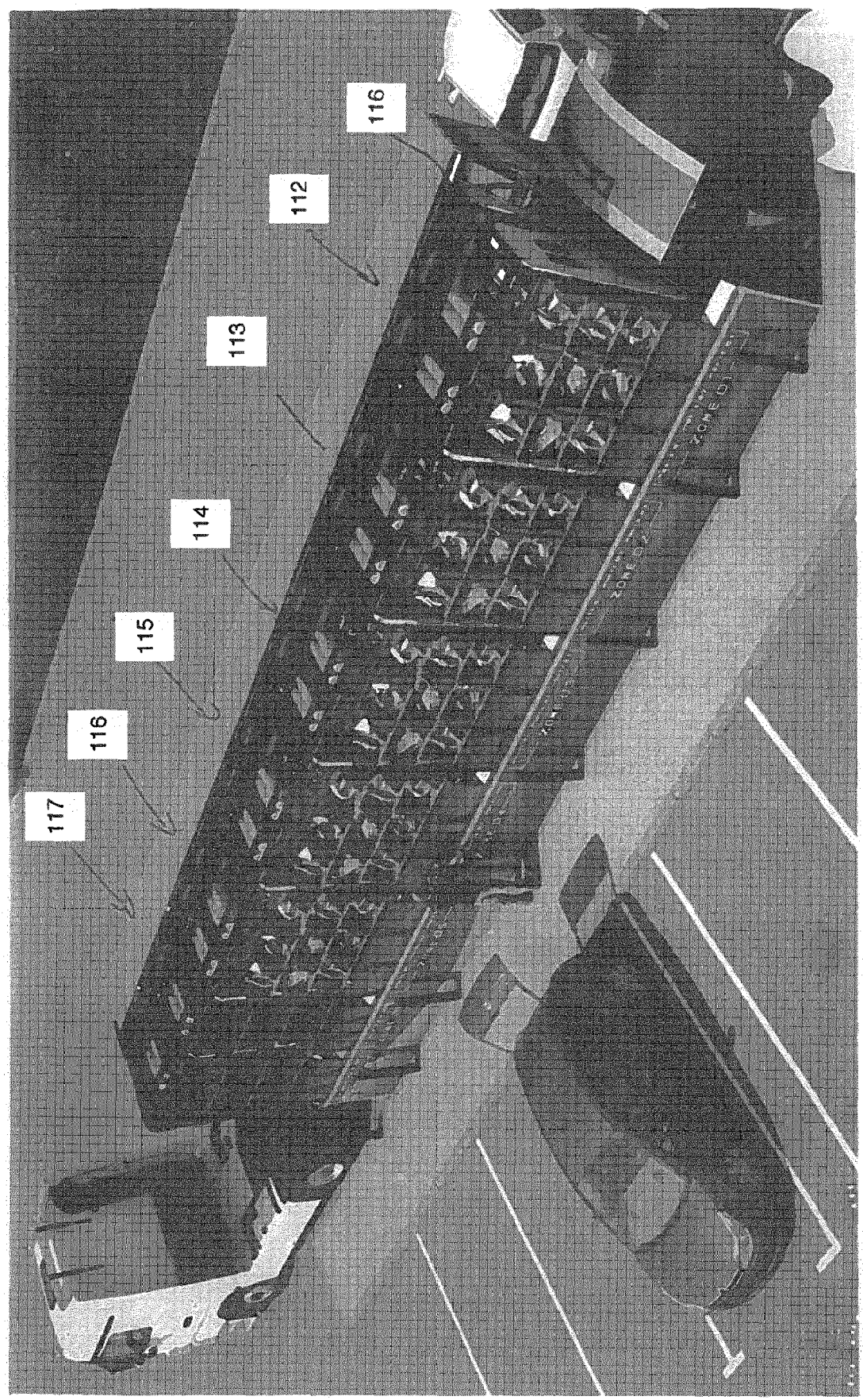
FIG. 4 shows a schematic view of a trailer according to the invention

FIGS. 3 to 5 show views of a trailer according to an advantageous alternative solution of the invention.

It consists of a frame having, in a known manner, two longitudinal side rails 101 whereon, at the rear, a running gear 102 and, at the front, a leg 103 are provided.

Additional side legs 104 are provided to improve stability at rest.

The frame is equipped, at the front, with a king-pin and electrical and pneumatic or hydraulic connections for connection with the towing vehicle when travelling on the road.

Side walls 105 and a roof 106 form a closed area.

Such wall has a series of hatches 107 each having an opening of about 40×60 centimeters, and arranged at a height of about 80 to 120 centimeters between the bottom of the hatch and the floor.

The trailer is loaded in an order preparation logistics center. The trailer is located near a loading dock, in compliance with the organization of logistics centers.

Once the trailer is loaded, it is transported using a towing 109 device. This zone is itself surrounded by a parking area 110 for the clients' vehicles coming to collect their order.

The rear of the trailer is equipped with a canopy 111 which shelters a piece of equipment used for entering the user's code. This piece of equipment comprises an optical bitmap code reader (e.g. QRcode or bar code) and possibly a keyboard for entering a text code, or even a short distance reader of the NFC type and a display for the presentation of instructions such as designation of the collecting hatch, and the procedure for opening the hatch.

FIG. 2 shows an exploded view of the trailer. It has blocks 112 to 115 each having three rows of partitioned compartments 116, open on the front. In the example described, the trailer has 516 compartments thus allowing as many different deliveries.

Each row is organized to allow the scrolling of the compartments to present the one matching the code entered by the client in front of the corresponding trap.

Some blocks are located in refrigerated zones. FIG. 3 shows an exemplary trailer comprising, at its front part, a low temperature refrigerating unit 117. The second and third compartments 118 and 119 are respectively kept at different temperatures using a temperature regulation 121, 122 or ventilation unit. The trailer thus can store respectively frozen, fresh and dry products under the best conditions.

The trailer comprises a self-contained power source, such as batteries, a generator and photovoltaic cells.

The invention claimed is:

1. An electronic commerce system comprising:
   an online ordering server,
   an order grouping center,
   and a trailer,
   with the online ordering server looking at items and preparing an order from a computer connected to the online ordering server via a computer network,
   with the order grouping center delivering a code,
   with the trailer having at least one access hatch opening on a side wall of the trailer that is controlled by a local computer and conversing with a code reader, said trailer comprises a plurality of mobile compartments each communicating with one access hatch to allow the positioning of one of the compartments opposite one access hatch to enable at least one of the removal of items and the introduction of items into at least one of the plurality of mobile compartments, wherein the plurality of mobile compartments are organized in rows and organized to allow scrolling of the plurality mobile compartments;
   the trailer allowing the registration of the code corresponding to the compartment into which the items of an order have been placed,
   a secure transmission of said code to a user who placed said order in the form of an electronic notification; and
   the code reader allowing said user to submit said code in order to activate movement of the compartment under consideration opposite the access hatch, and opening in order to remove the items corresponding to the order;
   with the rear of the trailer being equipped with a canopy which shelters the code reader used for entering the code.

2. An electronic commerce system according to claim 1, further comprising a plurality of equipment for providing the items and said equipment comprises a printer for printing labels to identify the batches of the same order and intended for different compartments of the same equipment for providing the items.

3. An electronic commerce system according to claim 1, further comprising a plurality of order preparation centers, and a server for outputting information for grouping a plurality of items of the same order prepared in different preparation centers.

4. A piece of equipment for providing items for an electronic commerce system according to claim 1, wherein said equipment comprises a kiosk having at least two series of mobile compartments to allow the movement opposite a counter, and a computer controlling the movement of said series of mobile compartments according to a code presented to a code reader.

5. The piece of equipment for providing items according to claim 4, wherein the kiosk comprises a plurality of mobile plates, each having partition walls forming said compartments.

6. The piece of equipment for providing items according to claim 4, wherein the kiosk has a first thermo-regulated zone at a temperature corresponding to the storage temperature of frozen items, a second thermo-regulated zone at a temperature corresponding to the storage temperature of fresh products, and a third zone at a temperature suitable for non-food products.

7. A piece of equipment for providing items according to claim 6, wherein the kiosk has N compartments in said first zone, 2N compartments in said second zone and 3N compartments in said third zone.

8. A piece of equipment for providing items according to claim 4, wherein the kiosk is mobile.

\* \* \* \* \*